US008964533B2

(12) United States Patent
Moore et al.

(10) Patent No.: US 8,964,533 B2
(45) Date of Patent: Feb. 24, 2015

(54) METHOD AND SYSTEM FOR PROVIDING MOBILE WIRELESS CALL FAILOVER

(75) Inventors: Devin C. Moore, Lewis Center, OH (US); Wade P. Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 428 days.

(21) Appl. No.: 13/325,760

(22) Filed: Dec. 14, 2011

(65) Prior Publication Data

US 2013/0155842 A1    Jun. 20, 2013

(51) Int. Cl.
*H04W 4/00*    (2009.01)
*G01R 31/08*    (2006.01)

(52) U.S. Cl.
USPC ............ 370/221; 370/328; 370/331; 370/338

(58) Field of Classification Search
USPC .......................... 370/221, 327, 331, 352, 384
See application file for complete search history.

(56) References Cited

U.S. PATENT DOCUMENTS

| | | | | |
|---|---|---|---|---|
| 5,913,166 A * | 6/1999 | Buttitta et al. | ................. | 455/436 |
| 2002/0183062 A1 * | 12/2002 | Kubosawa | .................... | 455/436 |
| 2003/0224791 A1 * | 12/2003 | Choi et al. | ..................... | 455/436 |
| 2004/0090937 A1 * | 5/2004 | Chaskar et al. | ................ | 370/331 |
| 2004/0196810 A1 * | 10/2004 | Kil et al. | ........................ | 370/331 |
| 2004/0264410 A1 * | 12/2004 | Sagi et al. | ..................... | 370/331 |
| 2005/0059400 A1 * | 3/2005 | Jagadeesan et al. | .......... | 455/436 |
| 2005/0153698 A1 * | 7/2005 | Sahim et al. | ................... | 455/444 |
| 2005/0271011 A1 * | 12/2005 | Alemany et al. | ............. | 370/331 |
| 2005/0271018 A1 * | 12/2005 | Liu et al. | ....................... | 370/338 |
| 2005/0282575 A1 * | 12/2005 | Dorenbosch | ............... | 455/550.1 |
| 2006/0116127 A1 * | 6/2006 | Wilhoite et al. | .............. | 455/442 |
| 2006/0126562 A1 * | 6/2006 | Liu | .................................. | 370/331 |
| 2007/0008928 A1 * | 1/2007 | Kezys | ............................ | 370/331 |
| 2007/0019584 A1 * | 1/2007 | Qi et al. | ........................ | 370/331 |
| 2007/0032236 A1 * | 2/2007 | Kim et al. | ..................... | 455/436 |
| 2007/0058588 A1 * | 3/2007 | Fashandi et al. | .............. | 370/331 |
| 2007/0091848 A1 * | 4/2007 | Karia et al. | ..................... | 370/331 |
| 2008/0070575 A1 * | 3/2008 | Claussen et al. | .............. | 455/436 |
| 2008/0181187 A1 * | 7/2008 | Scott et al. | ..................... | 370/338 |
| 2009/0122761 A1 * | 5/2009 | Hughes | ......................... | 370/331 |
| 2009/0278705 A1 * | 11/2009 | Chhabra et al. | .......... | 340/825.49 |
| 2010/0272083 A1 * | 10/2010 | Itoh et al. | ...................... | 370/338 |
| 2011/0110251 A1 * | 5/2011 | Krishnamurthy et al. | .... | 370/252 |
| 2011/0182221 A1 * | 7/2011 | Arakawa | ....................... | 370/311 |
| 2012/0051324 A1 * | 3/2012 | Hwang et al. | ................. | 370/331 |
| 2012/0252354 A1 * | 10/2012 | Itoh et al. | .......................... | 455/7 |

* cited by examiner

*Primary Examiner* — Ian N Moore
*Assistant Examiner* — Jenee Williams

(57) ABSTRACT

An approach for call failover to a packetized voice session is described. Impending signal failure is detected on a cellular link supporting a cellular call with a user device. A failover procedure is initiated in response to the detection, wherein the failover procedure includes detecting presence of a wireless data connection, and terminating the cellular call and concurrently activating a voice call application to establish a packetized voice session over the wireless data connection with the user device.

20 Claims, 9 Drawing Sheets

US 8,964,533 B2

METHOD AND SYSTEM FOR PROVIDING MOBILE WIRELESS CALL FAILOVER

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to establishing business transactions, to managing entertainment media, as well as a host of other tasks. Moreover, such mobile devices possess the capability to establish communication sessions using different technologies. That is, the mobile devices typically include circuitry to operate in a cellular network as well as circuitry to establish communications over a wireless data network. Unfortunately, existing approaches fail to effectively integrate the differing technologies.

Based on the foregoing, there is a need for better integration of telecommunications technologies and services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing call failover to a packetized voice session are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments are described with respect to the Internet Protocol (IP) based voice sessions and WiFi services, it is contemplated that these embodiments have applicability to other communication protocols and telecommunication services.

Figure 1A:
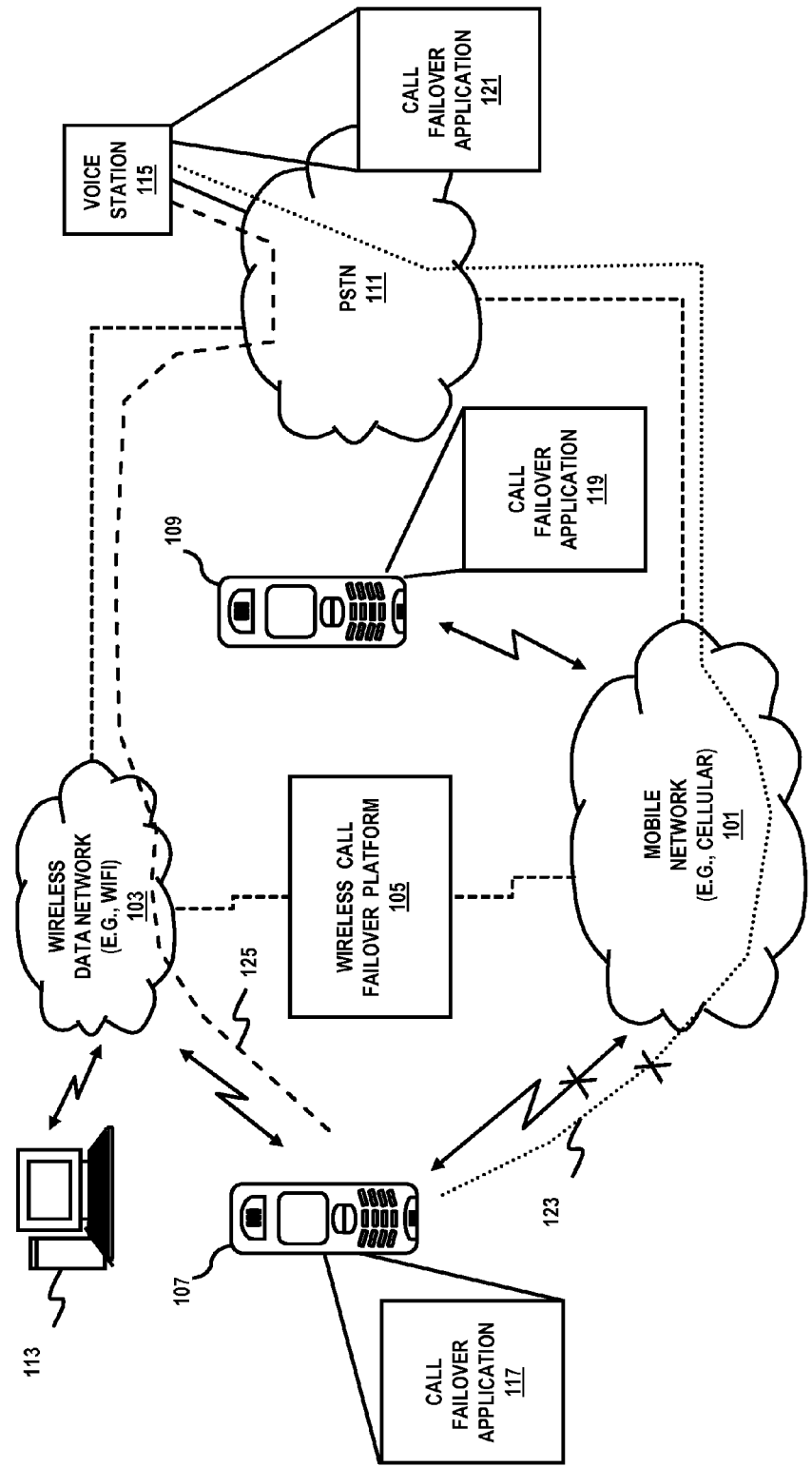
FIGS. 1A and 1B are diagrams of a system capable of providing mobile wireless call failover to a packetized voice call over a wireless data network, according to various exemplary embodiments.
Figure 1B:
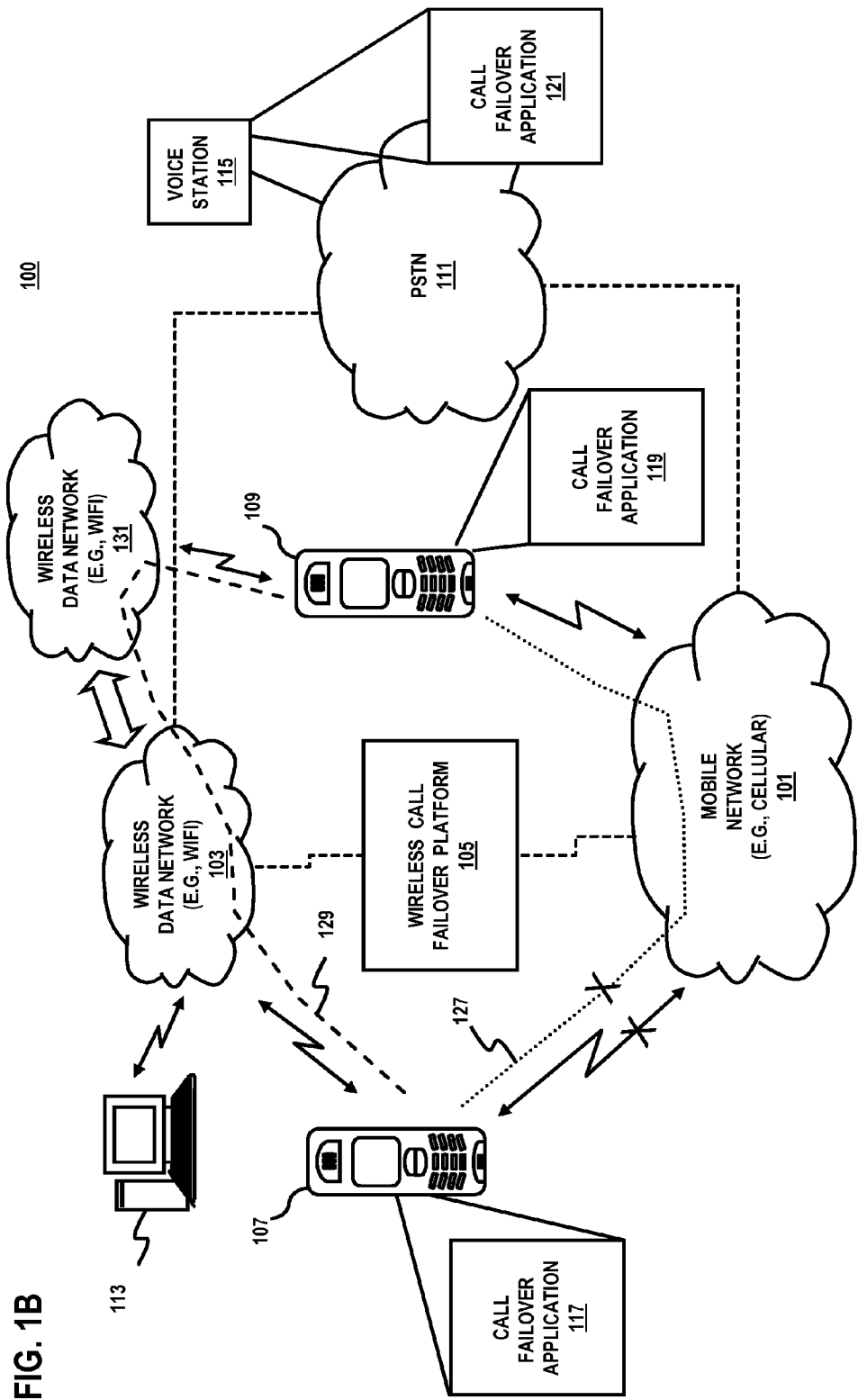

FIGS. 1A and 1B are diagrams of a system capable of providing mobile wireless call failover to a packetized voice call over a wireless data network, according to various exemplary embodiments. In particular, as shown in FIG. 1A, for the purpose of illustration, communication system 100 includes a mobile network 101 and a wireless data network 103; each of which utilizes separate communications technologies—e.g., cellular and wireless data (e.g., WiFi), respectively. The mobile network 101 can offer a variety of network-based telecommunication services, as it is recognized that certain types of services may benefit from the ability to control convergence of voice and data applications as well as services that leverage the global Internet. In this manner, network 101 can support cellular voice calls as well as packetized voice calls over data channels. In addition, system 100 includes a wireless data network 103, which provides packetized voice call services. As seen, a wireless call failover platform 105 can support the signaling or coordination of a call failover service, whereby a cellular call can effectively be "switched" over to a packetized voice call. In one embodiment, this failover service can be implemented as a managed network service, or alternatively, as an end user application (with little or no involvement, in terms of signaling for the failover procedure, by the network). In one embodiment, platform 105 can be a system that is operated by an independent service provider from that of the mobile network 10; in the alternative, platform 105 can be deployed within the mobile network 101. While specific reference will be made thereto, it is contemplated that the system 100 may embody many forms and include multiple and/or alternative components and facilities.

With the advent of the Internet, an increasing number of individuals have been migrating from the use of traditional communication based technologies to synergistic multimedia platforms. The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VoIP), is the conversion of voice information into data packets that are transmitted over an IP network. Users, such as including enterprises, also have turned to IP telephony as a matter of convenience in that both voice and data services are accessible through a single piece of equipment. The continual integration of voice and data services further fuels this demand for IP telephony applications.

Under the scenario of FIG. 1, mobile devices 107 and 109 are configured to communicate using mobile network 101 and wireless data network 103. The mobile devices 107 and 109 are illustrated as mobile (cellular) telephones, but may alternatively be other kinds of portable devices, such as personal digital assistants or communicators. It is also contemplated that the mobile devices 107 and 109 may support any type of interface for executing the failover procedure. In addition, mobile devices 107 and 109 may facilitate various input means for receiving and generating information, including touch screen capability, keyboard and keypad data entry, voice-based input mechanisms, accelerometer (e.g., shaking the mobile device 107 and 109), and the like. Any known and future implementations of mobile devices 107 and 109 are applicable. It is noted that, in certain embodiments, the mobile devices 107 and 109 may be configured to establish peer-to-peer communication sessions with each other using a variety of technologies—i.e., near field communication (NFC), BLUETOOTH, infrared, etc.

Mobile network 101 can be a wireless access and transport network, such as a cellular (2G, 3G, 4G, or above), 802.11, 802.15, 802.16, or satellite network; and may employ various mobile communication technologies including, for example, in cellular networks, global system for mobile communications/universal mobile telecommunication system (GSM/UMTS) technologies (i.e., 3GPP technologies) and code division multiple access (cdmaOne/CDMA2000) technologies (i.e., 3GPP2 technologies). In certain embodiments, wireless data network 103 can be a local area network (LAN), which utilizes WiFi technology. The LAN may utilize the dynamic host configuration protocol (DHCP) to dynamically assign "private" DHCP internet protocol (IP) addresses to mobile device 107 as well computing device 113. It is contemplated that device 113 can be configured to execute a "soft" phone to establish voice communication sessions with other devices, e.g., mobile devices 107 and 109.

Alternatively, network 103 can be a metropolitan area network (MAN), or a wide area network (WAN) that interfaces other systems and/or networks; e.g., the Internet, or any other suitable packet-switched network, as well as a circuit switched telephony network 111—for example, a Public Switched Telephone Network (PSTN). Thus, voice station 115 is reachable by the various user devices 107, 109, and 113.

When a caller places a voice call to a called party, the mobile network 101 maintains the call until one of the parties seek to terminate the communication. However, in certain scenarios, due to poor signal strength, the call may fail. From the users' perspective, call failure is highly undesirable, especially when the call is urgent or of some import. Traditionally, the users need to resort to manually re-establishing the call; such process can be rather burdensome and inefficient (in terms of time and use of network resources). For example, each party (not knowing the true case of the failed call) may concurrently attempt to call the other party at around the same period. Such uncoordinated attempts may result in each party simply defaulting into each other's respective voice mails (as the network would detect a busy signal). This reconnection process is particularly distracting if one or both of the parties are operating a vehicle. Hence, the failover service of system 100 addresses this issue by anticipating the call failure and appropriately initiating a call failover procedure that fully leverages the capabilities of the mobile device and network resources.

As shown, to enable the failover service, each of the participating devices (e.g., devices 107, 109, and 115) may include a call failover application (e.g., applications 117, 119, and 121). Depending on the particular service deployment, the call failover applications 117, 119, and 121 can be standalone applications that do not require network interaction or "thinner" applications whereby the main functions reside within the network.

Under the scenario of FIG. 1A, mobile device 107 can establish a cellular voice call 123 with voice station 115 over the mobile network 101 and PSTN 111. During the course of the voice session 123, mobile device 107 begins to experience a weak signal condition such that the voice session can no longer be sustained. For example, when the mobile device 107 enters an area that is likely to result in dropping of the call—e.g., a tunnel, a building, remote area with sparse coverage, etc., call failover application 117 can monitor the drop in signal strength below a predetermined threshold and initiate a call failover procedure. These call failover applications 117 and 121 can directly interact to execute the failover procedure, and/or involve the wireless call failover platform to employ certain network functions. With the impending failure of the cellular call, mobile device 107 and the voice station 115 can coordinate to establish an independent voice session 125 over the wireless data network 103, while placing the cellular call "on hold" or otherwise suspending the call until the call is lost.

By way of example, the packetized voice session is established using Session Initiation Protocol (SIP). A detailed discussion of SIP and its call control services are described in Internet Engineering Task Force (IETF) Request for Comment (RFC) 2543, entitled "SIP: Session Initiation Protocol"; RFC 3515, entitled "The Session Initiation Protocol (SIP) Refer Method"; RFC 3261, entitled "SIP: Session Initiation Protocol"; and RFC 3725, entitled "Best Current Practices for Third Party Call Control (3 pcc) in the Session Initiation Protocol (SIP)"; all of which are incorporated herein by reference in their entireties. SIP is used to create and terminate voice calls over a data network (e.g., network 103). However, it is understood that one of ordinary skill in the art would realize that the H.323 protocol and similar protocols can be utilized in lieu of SIP. The H.323 protocol, which is promulgated by the International Telecommunication Union (ITU), specifies a suite of protocols for multimedia communication. SIP is a signaling protocol that is based on a client-server model. It should be noted that both the H.323 protocol and SIP are not limited to IP telephony applications, but have applicability to multimedia services in general.

Since SIP can be used for signaling, a media session transported using schemes such as RTP (Reliable Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way.

Other call scenarios exist, e.g., whereby mobile device 107 engages in a cellular call 127 with another mobile device 109 (as seen in FIG. 1B). Here, mobile device 109 has connectivity to a wireless data network 131 that is separate and distinct from the wireless data network 103. In a mobile device to mobile device situation, the call failover applications 117 and 119 can independently monitor for signal degradation for the respective devices 107 and 109. Upon determining unacceptable signal strength by either one of the mobile devices 107 and 109, the corresponding device can initiate the failover procedure to establish a voice call over the networks 103 and 131.

In one embodiment, computing device 113 may be associated with a user of mobile device 107 and can interface wireless call failover platform 105 to access functions and settings of the platform 105 with respect to the failover service. According to certain embodiments, the computing device 113 may utilize a graphical user interface (GUI), such as a browser application or any web-based application, to input and update settings and configurations for the user's particular device through the web browser. Alternatively, the configuration can be performed by the communication device itself.

Although the failover service is described with respect to switching over from a cellular call maintained by mobile network 101 to a packetized voice call over wireless network 103, it is contemplated that the failover can occur from the packetized voice call to the cellular call.

Figure 2B:
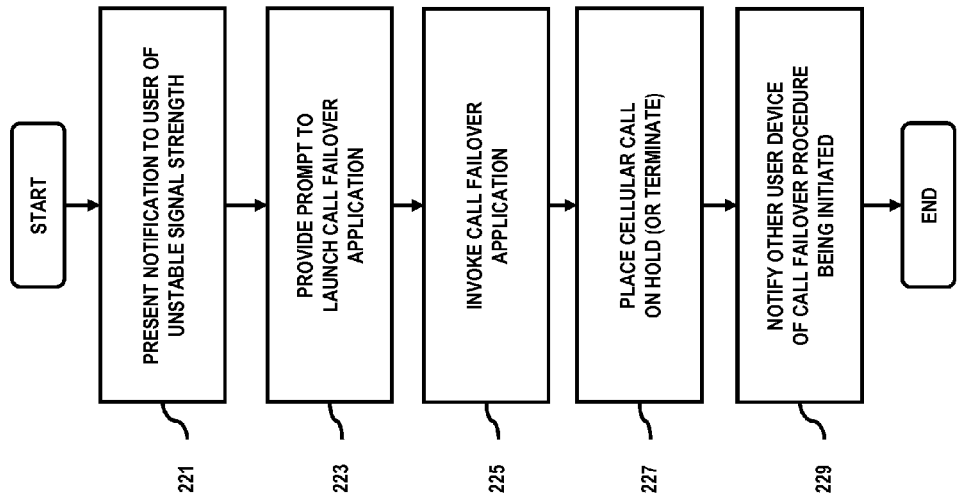
FIGS. 2A and 2B are flowcharts of processes involved with the failover service of the system of FIGS. 1A and 1B, according to various embodiments.
Figure 2A:
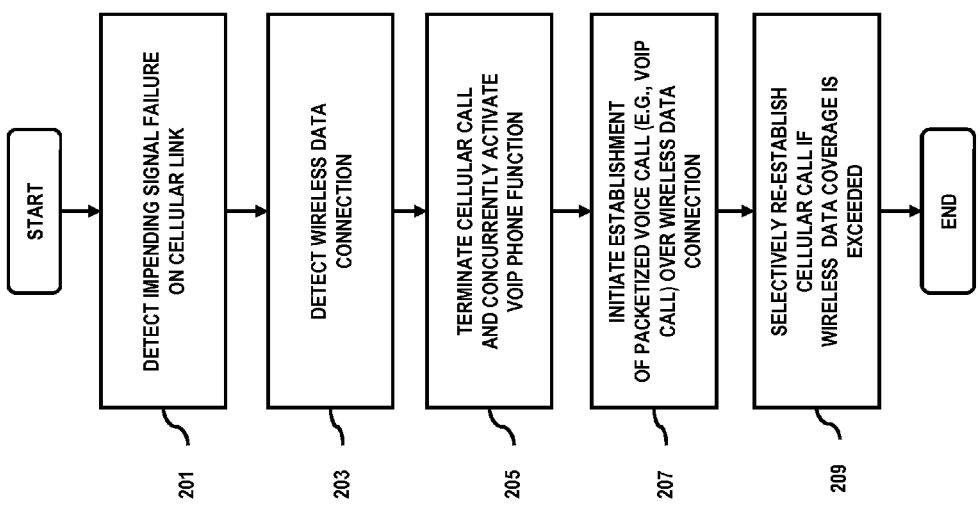

FIGS. 2A and 2B are flowcharts of processes involved with the failover service of the system of FIGS. 1A and 1B, according to various embodiments. It is noted that the steps of the process of FIGS. 2A and 2B may be performed in any suitable order, as well as combined or separated in any suitable manner. By way of example, these processes are explained in the context of FIG. 1B, in which two mobile devices 107 and 109 are communicating initially over a cellular connection.

In step 201, either the mobile device 107 or device 109 detects a signal degradation or failure on cellular link established over mobile network 101. As mentioned, the detection can be based on a variety of factors and parameters to measure and predict an impending signal failure. For example, reception strength can readily be measured and compared to a minimal strength threshold value to trigger the failover process. In addition or in the alternative, the mobile devices 107 and 109 can utilize other information to predict call failover; for example, location information (e.g., obtained through a Global Positioning System (GPS)) can indicate a known poor reception area. Also, weather or environmental information may be factored in for processing by the detection mechanism (as executed by the particular call failover application). In this example, it is assumed that mobile device 107 detects that it is within a building with poor reception. Once the signal failure is detected by device 107, as in step 203, the device 107 determines whether a wireless connection is available. For instance, mobile device 107, which in this example includes wireless networking circuitry, can detect presence of wireless data network 103, thereby availing the user of the option of failing over to a voice session established over the wireless data network 103. If the failover service is part of a managed service operated by a service provider, according to certain embodiments, wireless call failover platform 105 can facilitate the authentication of the subscribers of the service as well as managing the distribution of the call failover applications 117, 119 and 121. In one embodiment, the detection of the degraded signal can be analyzed at the failover platform 105, which can collect data relating to environmental conditions and location-based information, etc., in addition to signal measurements from the mobile device 107. In one embodiment, wireless call failover platform 105 can assist with signaling to the other participant device 109 about the impending call failure; e.g., by sending an alert to the call failover application 119 for presentation to the user.

In step 205, once a wireless data connection is detected, the cellular call can be disconnected, and the call failover application 117 can concurrently activate a packetized voice call application (e.g., VoIP call). In one embodiment, the packetized voice call application can be a separate application; alternatively, such application can be native or integrated with the call failover application 117. In step 207, the cellular call now effectively passes over to a VoIP call using a wireless connection supported, in part, by network 103. The VoIP call can transverse various networks, e.g., the global Internet, to ultimately reach wireless data network 131 that serves mobile device 109.

According to certain embodiments, the establishment of the connection may be signaled to the user of mobile device 109 using a variety of notification mechanisms, for example, a short message or an audible and/or visual indicator (e.g., ring to the caller and a beep tone to the called party) indicating that the call will be terminated due to a signal problem and that a failover to a VoIP call has been initiated. Once the new connection is up, the mobile devices 107 and 109 remain in communication until the users end the call.

As an option, the call failover application 117 may monitor signal strength on the wireless data network 103 and revert back to the cellular network 101 to continue communicating (assuming the cellular connection can be sustained). Consequently, per step 209, mobile device 107 may selectively re-establish the cellular call if the packetized voice call over network 103 fails—e.g., wireless data coverage is exceeded.

Continuing with the example of FIG. 2A, the failover process from the perspective of the user interface is provided, according to one embodiment. Under the scenario of FIG. 2B, it is assumed the mobile devices 107 and 109 have established a cellular call over a cellular link or connection. In step 221, the user is presented with a notification of unstable signal strength by mobile device 107, for instance. The process then involves generating and providing a prompt to the user to launch call failover application 117, as in step 223. In one embodiment, the user may decline to have the call failover. Alternatively, the user may provide an input to invoke the call failover application (per step 225). At this junction, the cellular call may be placed on hold (or effectively be terminated), as in step 227. In one embodiment, during this period, the other party may receive some form of notification (e.g., visual and/or audible indicator) that the call failover procedure is in progress. By way of example, this notification can be signaled directly by call failover application 117, or in conjunction with platform 105. Next, the other device (e.g., mobile device 109) is also notified of the failover of the cellular call to the VoIP call, per step 229. In this manner, the user of mobile device 109 can be prepared to accept the call by another means.

Figure 3:
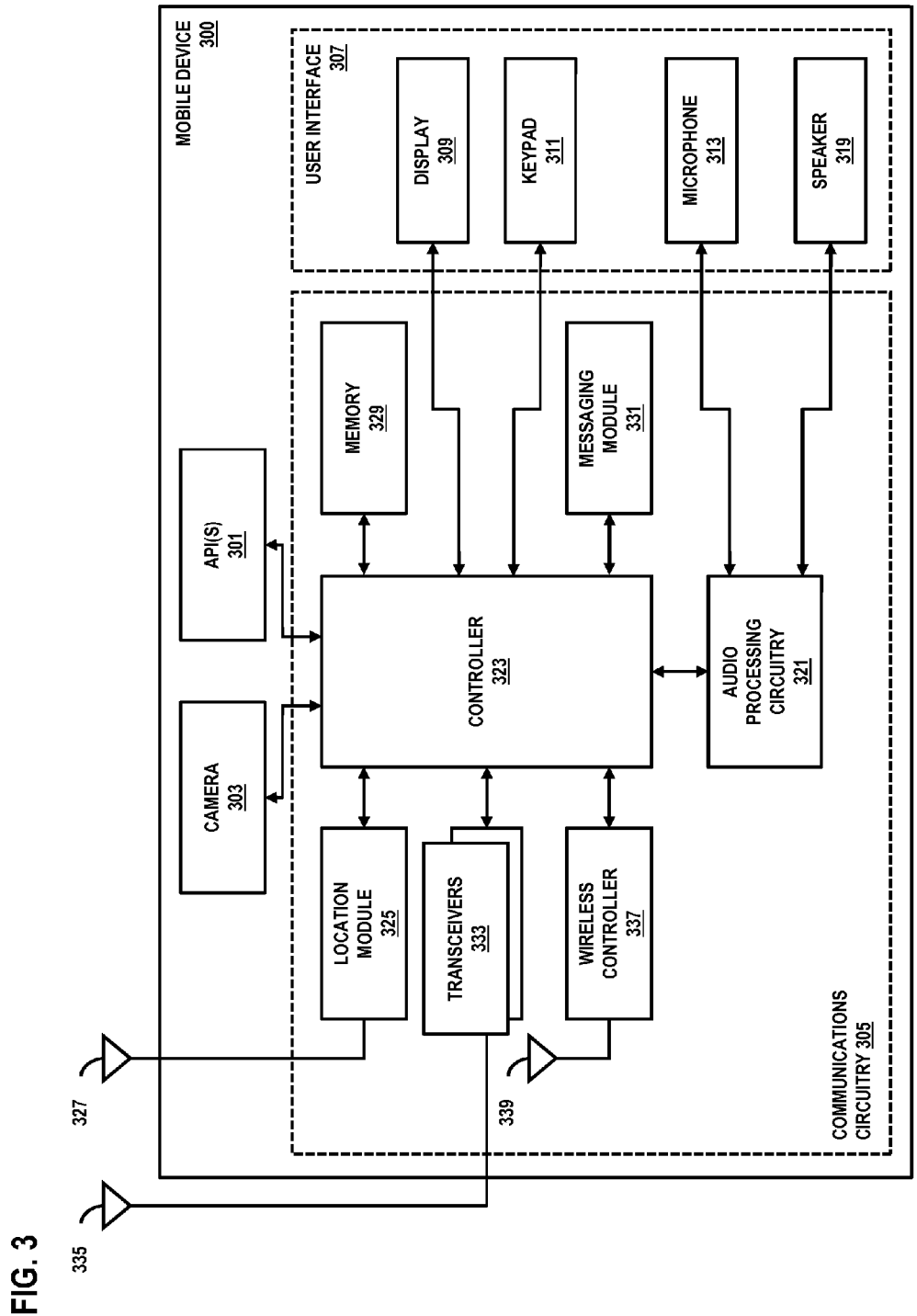
FIG. 3 is a diagram of a mobile device configured to facilitate automated mobile wireless call failover, according to an exemplary embodiment.

FIG. 3 is a diagram of a mobile device configured to facilitate automated mobile wireless call failover, according to an exemplary embodiment. Mobile device 300 may comprise computing hardware (such as described with respect to FIGS. 6 and 7), as well as include one or more components configured to execute the processes described herein for initiating the call failover procedure of system 100. In this example, mobile device 300 includes application programming interface(s) 301, camera 303, communications circuitry 305, and user interface 307. While specific reference will be made hereto, it is contemplated that mobile device 300 may embody many forms and include multiple and/or alternative components.

According to exemplary embodiments, user interface 305 may include one or more displays 309, keypads 311, microphones 313, and/or speakers 315. Display 309 provides a graphical user interface (GUI) that permits a user of mobile device 300 to view dialed digits, call status, menu options, and other service information. The GUI may include icons and menus, as well as other text and symbols. Keypad 309 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 311 coverts spoken utterances of a user (or other auditory sounds, e.g., environmental sounds) into electronic audio signals, whereas speaker 319 converts audio signals into audible sounds.

Communications circuitry 305 may include audio processing circuitry 321, controller 323, location module 325 (such as a GPS receiver) coupled to antenna 327, memory 329, messaging module 331, multiple transceivers 333 coupled to antenna 335, and wireless controller 337 coupled to antenna 339. The transceivers 333, according to certain embodiments, employ differing technologies—e.g., cellular communications and wireless data communications (e.g., WiFi). Memory 329 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with controller 323. Memory 329 may store information, such as one or more user profiles, one or more user defined policies, one or more contact lists, personal information, sensitive information, work related information, etc.

Additionally, it is contemplated that mobile device 300 may also include one or more applications and, thereby, may store (via memory 329) data associated with these applications for providing users with the call failover functions, browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 300 from, for example, platform 105 may be utilized by API(s) 301 and/or controller 323 to facilitate remotely configuring, modifying, and/or utilizing one or more features, options, settings, etc., of these applications. It is also contemplated that these (or other) control signals may be utilized by controller 323 to facilitate remotely backing up and/or erasing data associated with these applications. In other instances, the control signals may cause mobile device 300 to become completely or partially deactivated or otherwise inoperable.

Accordingly, controller 323 controls the operation of mobile station 300, such as in response to commands received from API(s) 301 and/or data stored to memory 329. Control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 319 and receives analog audio inputs from microphone 313. In exemplary embodiments, controller 323 may be controlled by API(s) 301 in order to capture signals from camera 303 or microphone 313 in response to control signals received from platform 105. In other instances, controller 323 may be controlled by API(s) 301 to cause location module 325 to determine spatial positioning information corresponding to a location of mobile device 300. Still further, controller 323 may be controlled by API(s) 301 to image (e.g., backup) and/or erase memory 329, to configure (or reconfigure) functions of mobile device 300, to track and generate device usage logs, or to terminate services available to mobile device 300. It is noted that captured signals, device usage logs, memory images, spatial positioning information, and the like, may be transmitted to platform 105 via transceiver 333 and/or wireless controller 337. In this manner, the captured signals and/or other forms of information may be presented to users and stored to one or more networked storage locations, such as user profiles repository (not shown), or any other suitable storage location or memory of (or accessible to) the components and facilities of system 100.

It is noted that real time spatial positioning information may be obtained or determined via location module 325 using, for instance, satellite positioning system technology, such as GPS technology. In this way, location module 325 can behave as (or substantially similar to) a GPS receiver. Thus, mobile device 300 employs location module 325 to communicate with a constellation of satellites. These satellites transmit very low power interference and jamming resistant signals received by GPS receivers 325 via, for example, antennas 327. At any point on Earth, GPS receiver 325 can receive signals from multiple satellites, such as six to eleven. Specifically, GPS receiver 325 may determine three-dimensional geolocation (or spatial positioning information) from signals obtained from multiple satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 300 is able to identify signals from the satellites, receivers 325 may decode the ephemeris and clock data, determine the pseudo range for each satellite and, thereby, compute the spatial positioning of a receiving antenna 327. With GPS technology, mobile device 300 can determine its spatial position with great accuracy and convenience. It is contemplated, however, that location module 325 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 300 also includes messaging module 331 that is configured to receive, transmit, and/or process messages (e.g., EMS messages, SMS messages, MMS messages, IM messages, electronic mail messages, and/or any other suitable message) received from (or transmitted to) platform 105 or any other suitable component or facility of system 100. As previously mentioned, platform 105 may transmit control singles to mobile device 300 in the form of one or more API 301 directed messages, e.g., one or more BREW directed SMS messages. As such, messaging module 331 may be configured to identify such messages, as well as activate API(s) 301, in response thereto. Furthermore, messaging module 331 may be further configured to parse control signals from these messages and, thereby, port parsed control signals to corresponding components of mobile device 300, such as API(s) 301, controller 323, location module 325, memory 329, transceiver 333, wireless controller 337, etc., for implementation.

According to exemplary embodiments, API(s) 301 (once activated) is configured to effectuate the implementation of the control signals received from platform 105 or from call failover applications resident in other devices. It is noted that the control signals are utilized by API(s) 301 to, for instance, remotely control, configure, monitor, track, and/or capture signals from (or related to) camera 303, communications circuitry 305, and/or user interface 307. In this manner, visual and/or acoustic indicia pertaining to an environment surrounding mobile device 300 may captured by API(s) 301 controlling camera 303 and microphone 313. Other control signals to cause mobile device 300 to determine spatial positioning information, to image and/or erase memory 329, to configure (or reconfigure) functions, to track and generate device usage logs, or to terminate services, may also be carried out via API(s) 301. As such, one or more signals captured from camera 303 or microphone 313, or device usage logs, memory images, spatial positioning information, etc., may be transmitted to platform 105 via transceivers 333 and/or wireless controller 337, in response to corresponding control signals provided to transceivers 333 and/or wireless controller 337 by API(s) 301. Thus, captured signals and/or one or more other forms of information provided to platform 105 may be presented to users and/or stored to one or more of user profiles repository, or any other suitable storage location or memory of (or accessible to) the components and facilities of system 100.

It is also noted that mobile device 300 can be equipped with wireless controller 337 to communicate with a wireless headset (not shown) or other wireless network. The headset can employ any number of standard radio technologies to communicate with wireless controller 337; for example, the headset can be BLUETOOTH enabled. It is contemplated that other equivalent short range radio technology and protocols can be utilized. While mobile device 300 has been described in accordance with the depicted embodiment of FIG. 3, it is contemplated that mobile device 300 may embody many forms and include multiple and/or alternative components.

Figure 4:
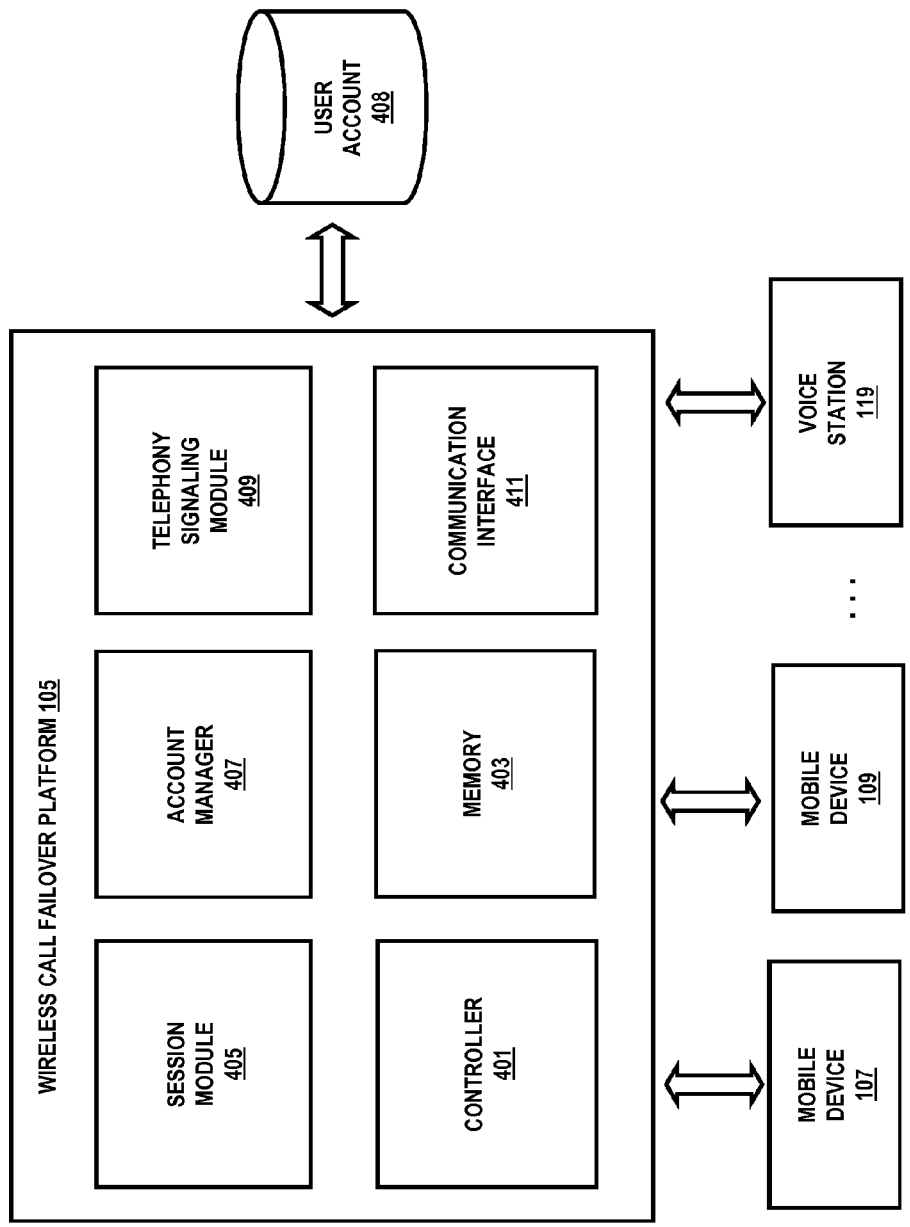
FIG. 4 is a diagram of a configuration platform utilized in the system of FIG. 1, according to an exemplary embodiment.

FIG. 4 is a diagram of the components of a wireless call failover platform, according to an exemplary embodiment. The wireless call failover platform 105 may comprise computing hardware (such as described with respect to FIG. 6), as well as include one or more components configured to execute the processes described herein for providing mobile wireless call failover. It is contemplated that the functions of these components may be combined in one or more components or performed by other components of equivalent functionality. In one implementation, the wireless call failover platform 105 includes a controller (or processor) 401, memory 403, a session module 405, an account manager 407, a caching module 409, and a communication interface 411.

The controller 401 may execute at least one algorithm relating to functions of the wireless call failover platform 105. For example, the controller 401 may interact with the session module 405 to monitor signal levels of registered mobile devices (e.g., devices 107 and 109) for triggering of the call failover as described above with respect to FIGS. 2A and 2B. If, for instance, a signal failure in a communication session over cellular occurs, the session module 405 will detect the impending signal failure on the cellular link (or alternatively on the wireless data link); this detection may be aided by actual measurement information from the particular mobile device. The session module 405 may, for example, store data relating to the establishment and termination of the cellular call and the VoIP call for the purpose of billing.

Also, the session module 405 may operate with the account manager 407 to determine whether the mobile devices are indeed valid subscribers to the call failover service. User account information, along with user preference information for the service, may be stored in a user account database 408; such information may include the user's telephone number assigned to the particular mobile device, device identifier associated with the mobile device, etc. If, for instance, the account manager 407 determines that the user is a registered user, the account manager 407 may cause the session module 405 to complete the wireless call failover process. On the other hand, the session module 405 may not initiate completion of the wireless call failover process, instead if the user (of the receiving device) is not a subscriber to the call failover service, the account manager 407 may generate a prompt to offer a subscription to such user.

The controller 401 may further utilize the communication interface 411 to communicate with other components of the system 100. The communication interface 411 may include multiple means of communication. For example, the communication interface 411 may be able to communicate over short message service (SMS), multimedia messaging service (MMS), internet protocol, instant messaging, voice sessions (e.g., via a phone network), email, or other types of communication. According to one embodiment, such methods may be used to transmit messages or alerts to inform users of information relating to the failure of the communication session. These messages or alerts can then be utilized by the respective user devices (e.g., mobile devices 107 and 109, voice station 115, etc.) to generate notification messages including such information.

Figure 5B:
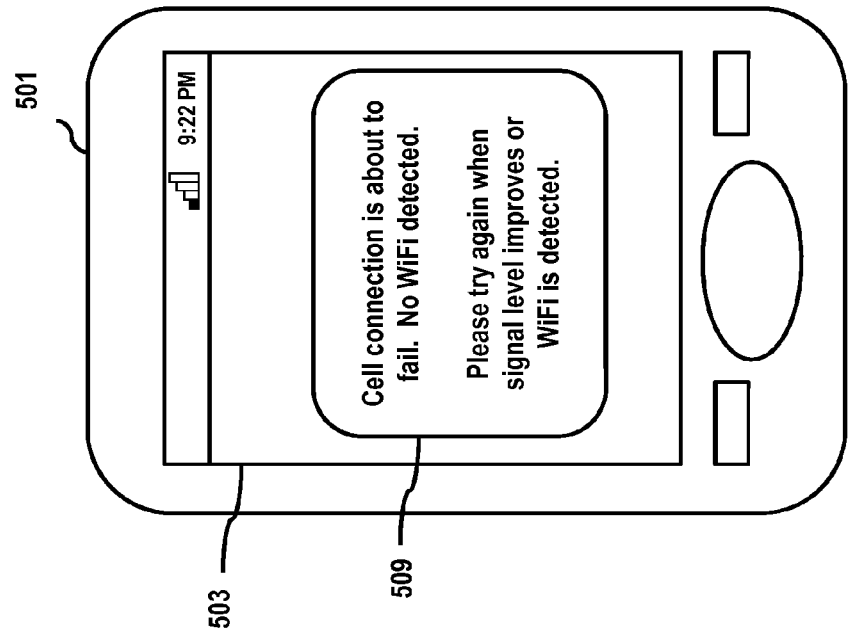
FIGS. 5A-5C are diagrams of exemplary screens of a graphical user interface (GUI) for a call failover service, according to various exemplary embodiments.
Figure 5A:
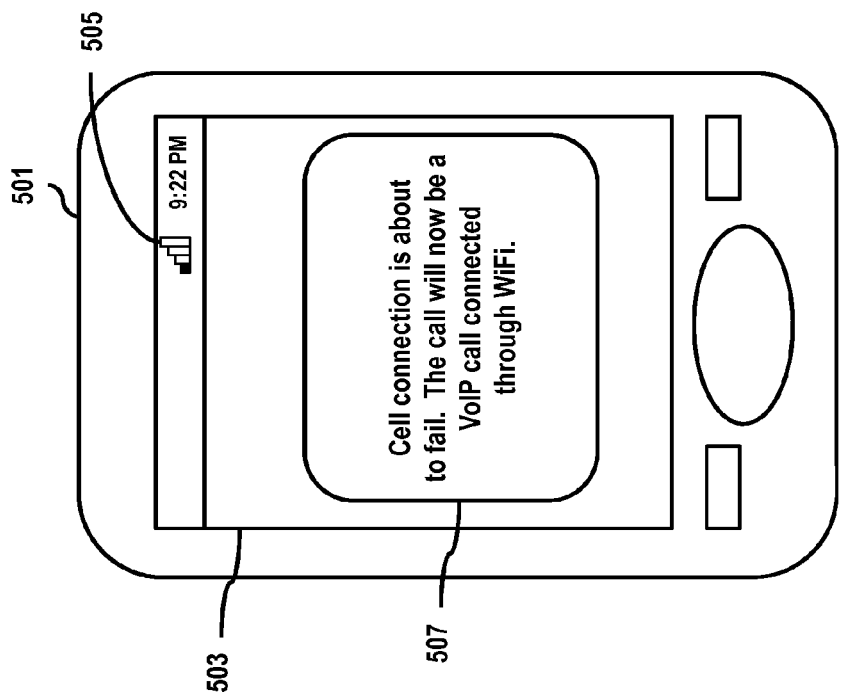
Figure 5C:
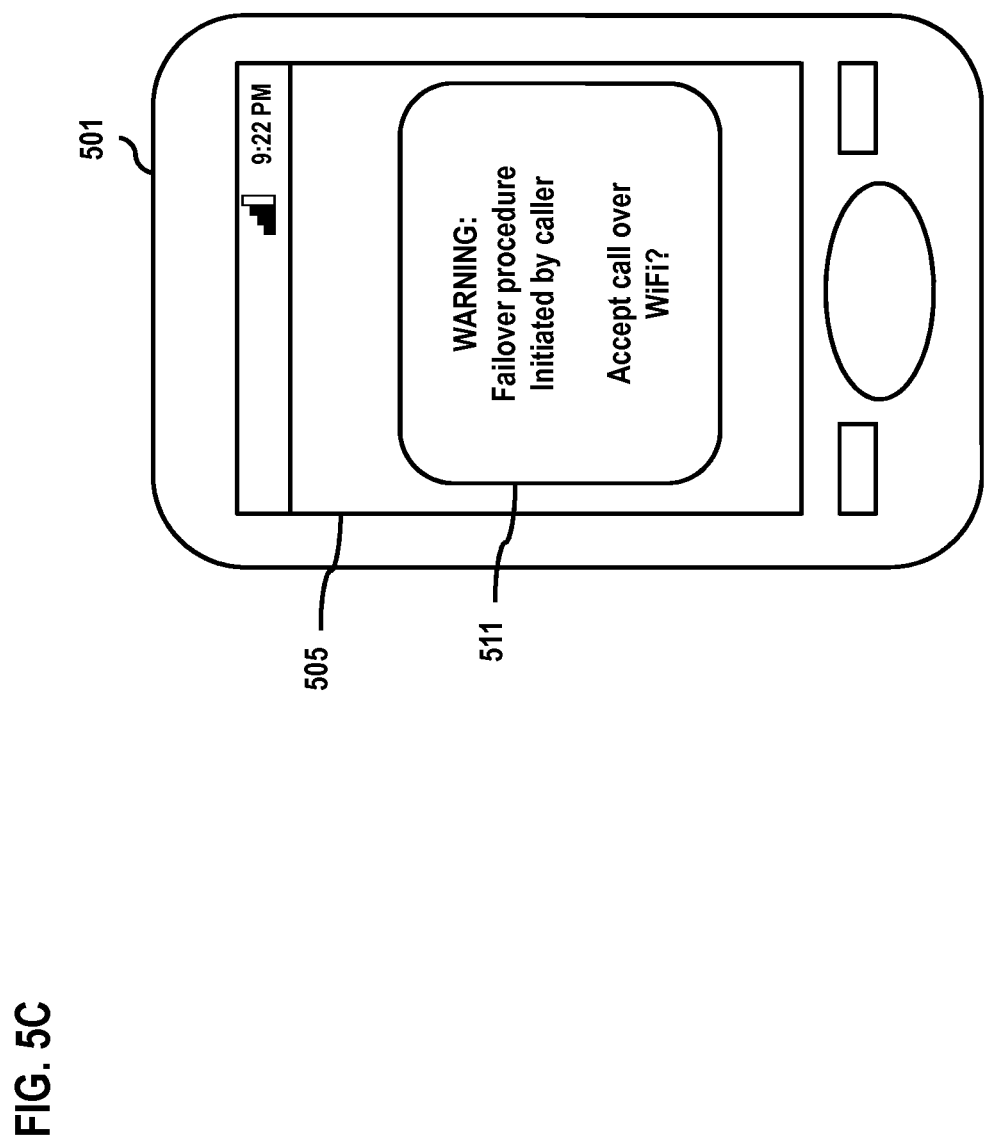

FIGS. 5A-5C are diagrams of exemplary screens of a graphical user interface (GUI) for a call failover service, according to various exemplary embodiments. As seen in FIG. 5A, by way of example, a user device 501 includes a display 503 for presenting a GUI that includes a signal level indicator 505 and a message box 507. Message box 507 provides textual data to alert the calling party that the cellular call is susceptible to being dropped (as evident by the low signal level depicted by indicator 505). In this example, message box 507 states the following text: "Cell connection is about to fail. The call will now be a VoIP call connected through WiFi." In this manner, the user is also notified of the fact that another communication session (e.g., VoIP call) is being established using, e.g., a WiFi connection.

In another scenario, if the mobile device 501 cannot detect a wireless network, a message box 509 may be presented to notify the user to attempt the call when either the cellular signal level improves or the WiFi connection is detected. Consequently, message box 509 can state the following: "Cell connection is about to fail. No WiFi detected. Please try again when signal level improves or WiFi is detected." In other of the scenarios, an audio indicator may be provided as well— e.g., a beeping tone or a user specified sound.

The GUI of FIGS. 5A and 5B are from the perspective of the calling device (e.g., mobile device 107 of the scenario of FIG. 1B), while FIG. 5C provides an exemplary GUI for the receiving mobile device (e.g., device 109). In the example of FIG. 5C, mobile device (e.g., device 109) can receive a notification that alerts the called party that the originating mobile device 107 has experienced a signal failure and that a VoIP call is being established over a WiFi connection. Accordingly, a message box 511 is provided as follows: "WARNING: Failover procedure initiated by caller. Accept call over WiFi?" At this point, the user may elect to continue the conversation with the calling party over a different voice session without anyone of the parties having to manually establish the VoIP call. Advantageously, such arrangement improves the user experience, while providing a new source of revenue for service providers. Moreover, system resources are not unnecessarily expended to re-establish the cellular call.

The processes described herein for providing a call failover procedure may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
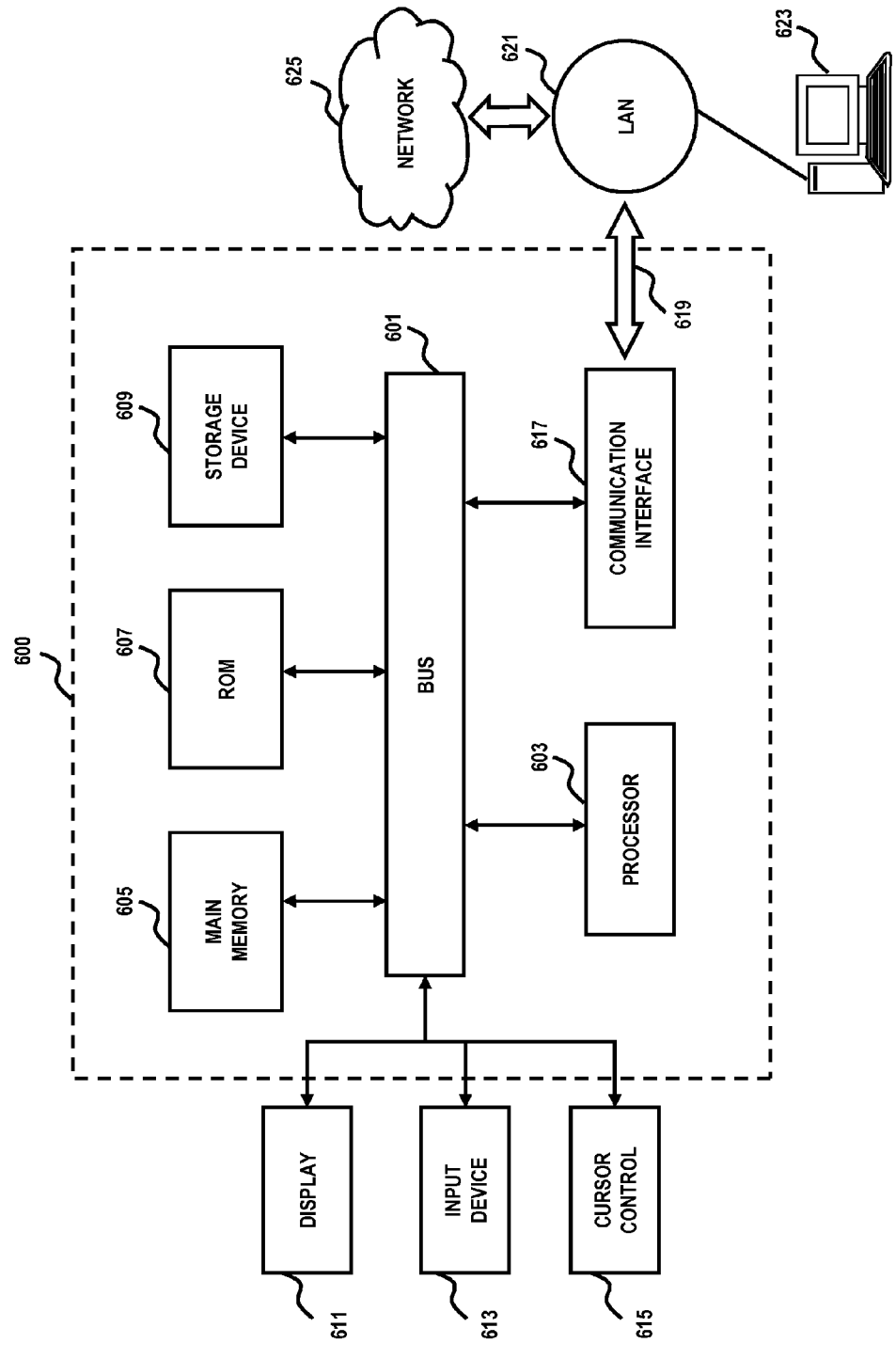
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk, flash storage, or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. Additional output mechanisms may include haptics, audio, video, etc. An input device 613, such as a keyboard including alphanumeric and other keys, is coupled to the bus 601 for communicating information and command selections to the processor 603. Another type of user input device is a cursor control 615, such as a mouse, a trackball, touch screen, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
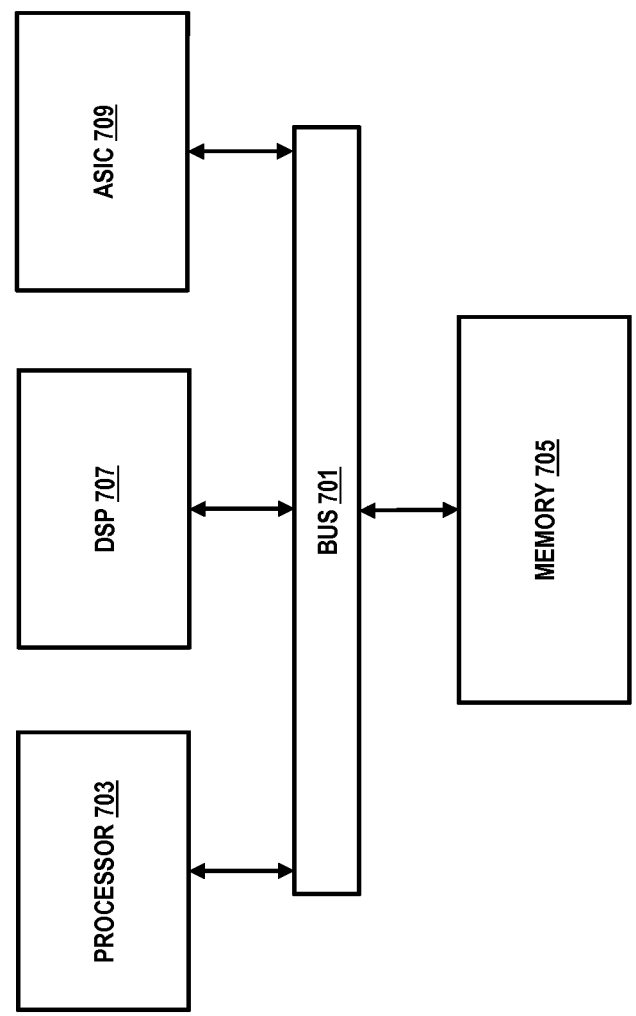
FIG. 7 is a diagram of a chip set that can be used to implement various exemplary embodiments.

FIG. 7 illustrates a chip set or chip 700 upon which an embodiment of the invention may be implemented. Chip set 700 is programmed to enable incomplete action monitoring and service for data transactions as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling incomplete action monitoring and service for data transactions.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable incomplete action monitoring and service for data transactions. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting by a user device impending signal failure on a cellular link supporting a cellular call with the user device;
   initiating and signaling a failover procedure by the user device independent of a handoff server, in response to the detection, wherein the failover procedure includes,
      detecting presence of a wireless data connection that is separate from a cellular network supporting the cellular link, and
      terminating the cellular call and concurrently activating a voice call application to establish a packetized voice session over the wireless data connection with the user device; and
   presenting, at the user device, notification of the signal failure and that no network connection is detected for the packetized voice session, wherein the notification prompts a user of the user device to attempt the packetized voice session later.

2. A method according to claim 1, further comprising:
   selectively re-establishing the cellular call if wireless data coverage is exceeded,
   wherein the packetized voice session is connected through a wireless local area network including Wifi.

3. A method according to claim 1, further comprising:
   presenting another notification, at a mobile device that is a party to the cellular call, of the signal failure and that the packetized voice session is going to be established over the wireless data connection.

4. A method according to claim 3, wherein the another notification prompts the user of the mobile device to accept the packetized voice session.

5. A method according to claim 1, further comprising:
   generating a prompt relating to the initiation of the failover procedure.

6. A method according to claim 1, further comprising:
   generating a notification message for presentation to the user device, wherein the notification message specifies the initiation of the failover procedure.

7. A method according to claim 1, wherein the packetized voice session is a Voice over Internet Protocol (VoIP) call, and the user device includes a cellular phone or a voice station.

8. An apparatus comprising:
   at least one processor; and
   at least one memory including computer program code for one or more programs,
   the at least one memory and the computer program code configured to, with the at least one processor, cause the apparatus embedded in a user device to perform at least the following,
   detect impending signal failure on a cellular link supporting a cellular call with the user device,
   initiate and signal a failover procedure independent of a handoff server, in response to the detection, wherein the failover procedure includes,
      detecting presence of a wireless data connection that is separate from a cellular network supporting the cellular link, and
      terminating the cellular call and concurrently activating a voice call application to establish a packetized voice session over the wireless data connection with the user device; and
   present, at the user device, notification of the signal failure and that no network connection is detected for the packetized voice session, wherein the notification prompts a user of the user device to attempt the packetized voice session later.

9. An apparatus according to claim 8, wherein the apparatus is further caused to:
   selectively re-establish the cellular call if wireless data coverage is exceeded, wherein the packetized voice session is connected through a wireless local area network including Wifi.

10. An apparatus according to claim 8, wherein the apparatus is further caused to:
present notification, at a mobile device that is a party to the cellular call, to a user of the signal failure.

11. An apparatus according to claim 8, wherein the apparatus is further caused to:
generate a prompt relating to the initiation of the failover procedure.

12. An apparatus according to claim 8, wherein the apparatus is further caused to:
generate a notification message for presentation to the user device, wherein the notification message specifies the initiation of the failover procedure.

13. An apparatus according to claim 8, wherein the packetized voice session is a Voice over Internet Protocol (VoIP) call.

14. An apparatus according to claim 8, wherein the user device includes a cellular phone or a voice station.

15. A method comprising:
establishing a cellular call between a calling mobile device and a call receiving device over a cellular link;
presenting to the calling mobile device a first notification message indicating a signal failure and that no network connection is detected for a packetized voice call, wherein the first notification message prompts a user of the calling mobile device to attempt the packetized voice call later;
presenting to the call receiving device a second notification message indicating initiation of a failover procedure by the calling mobile device to terminate the cellular call and to establish the packetized voice call; and
causing, at least in part, initiation of the failover procedure in response to acceptance of the packetized voice call by the call receiving device.

16. A method according to claim 15, further comprising:
placing the cellular call on hold during the establishment of the packetized voice call.

17. A method according to claim 15, wherein the packetized voice call is established over a wireless data connection, the method further comprising:
selectively re-establishing the cellular call if a wireless data coverage area supporting the wireless data connection is exceeded by the calling mobile device.

18. An apparatus comprising:
at least one processor; and
at least one memory including computer program code for one or more programs,
the at least one memory and the computer program code configured to, with the at least one processor, cause the apparatus embedded in a calling mobile device to perform at least the following,
establish a cellular call between the calling mobile device and a call receiving device over a cellular link,
present to the calling mobile device a first notification message indicating a signal failure and that no network connection is detected for a packetized voice call, wherein the first notification message prompts a user of the calling mobile device to attempt the packetized voice call later,
present to the call receiving device a second notification message indicating initiation of a failover procedure by the calling mobile device to terminate the cellular call and to establish the packetized voice call, and
cause, at least in part, initiation of the failover procedure in response to acceptance of the packetized voice call by the call receiving device.

19. An apparatus according to claim 18, wherein the apparatus is further caused to:
place the cellular call on hold during the establishment of the packetized voice call.

20. An apparatus according to claim 18, wherein the packetized voice call is established over a wireless data connection, and the apparatus is further caused to:
selectively re-establish the cellular call if a wireless data coverage area supporting the wireless data connection is exceeded by the calling mobile device.

* * * * *